Figure 1:
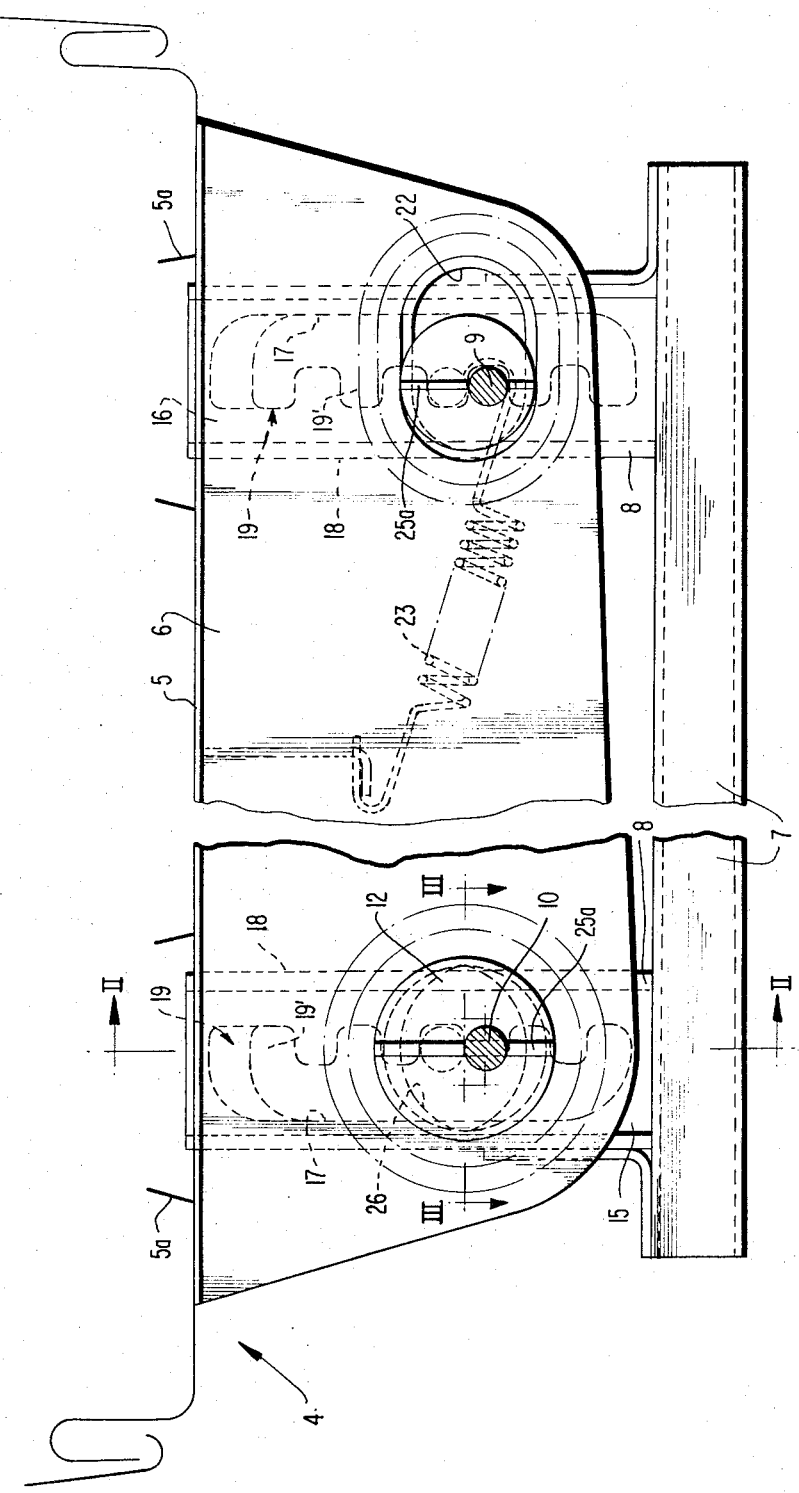

United States Patent [19]
Brand

[11] 3,724,895
[45] Apr. 3, 1973

[54] MECHANISM FOR ADJUSTING THE HEIGHT OF SEATS, ESPECIALLY OF MOTOR VEHICLES

[75] Inventor: Oskar Brand, Darmsheim, Germany

[73] Assignee: Daimler-Benz Aktiengesellschaft, Stuttgart-Unterturkheim, Germany

[22] Filed: Oct. 26, 1971

[21] Appl. No.: 192,527

[30] Foreign Application Priority Data

Oct. 31, 1970 Germany.....................P 20 53 665.6

[52] U.S. Cl. ................297/348, 74/89.17, 297/338, 297/331, 248/188.2, 248/422
[51] Int. Cl..............................................A49b 1/00
[58] Field of Search......297/348, 331, 338, 344, 345; 248/401, 161, 407, 151, 423, 188.2, 422; 74/89.17, 89.18, 422

[56] References Cited

UNITED STATES PATENTS

| | | |
|---|---|---|
| 7,687 | 5/1877 | Morrison............................297/348 |
| 8,380 | 8/1878 | White et al.........................297/348 |
| 957,176 | 5/1910 | Anderson...........................248/422 |
| 1,957,785 | 5/1934 | Knapp................................248/422 |
| 2,298,351 | 10/1942 | DeRose.............................248/422 |
| 2,596,033 | 5/1952 | King..................................248/422 |
| 2,930,428 | 3/1960 | Rose..................................248/422 |
| 505,256 | 9/1893 | Smith................................248/422 |

Primary Examiner—Francis K. Zugel
Assistant Examiner—Garry Moore
Attorney—Craig, Antonelli and Hill

[57] ABSTRACT

An installation for adjusting the inclination and height of a seat, especially of a motor vehicle seat, supported on a shaft which itself is supported in two side walls secured at the seat; the shaft is provided with cranked portions which engage in toothed rows arranged mutually offset as regards the height thereof, of which two serve alternately as bearing means for the associated cranked portions during the rotation of the shaft.

16 Claims, 3 Drawing Figures

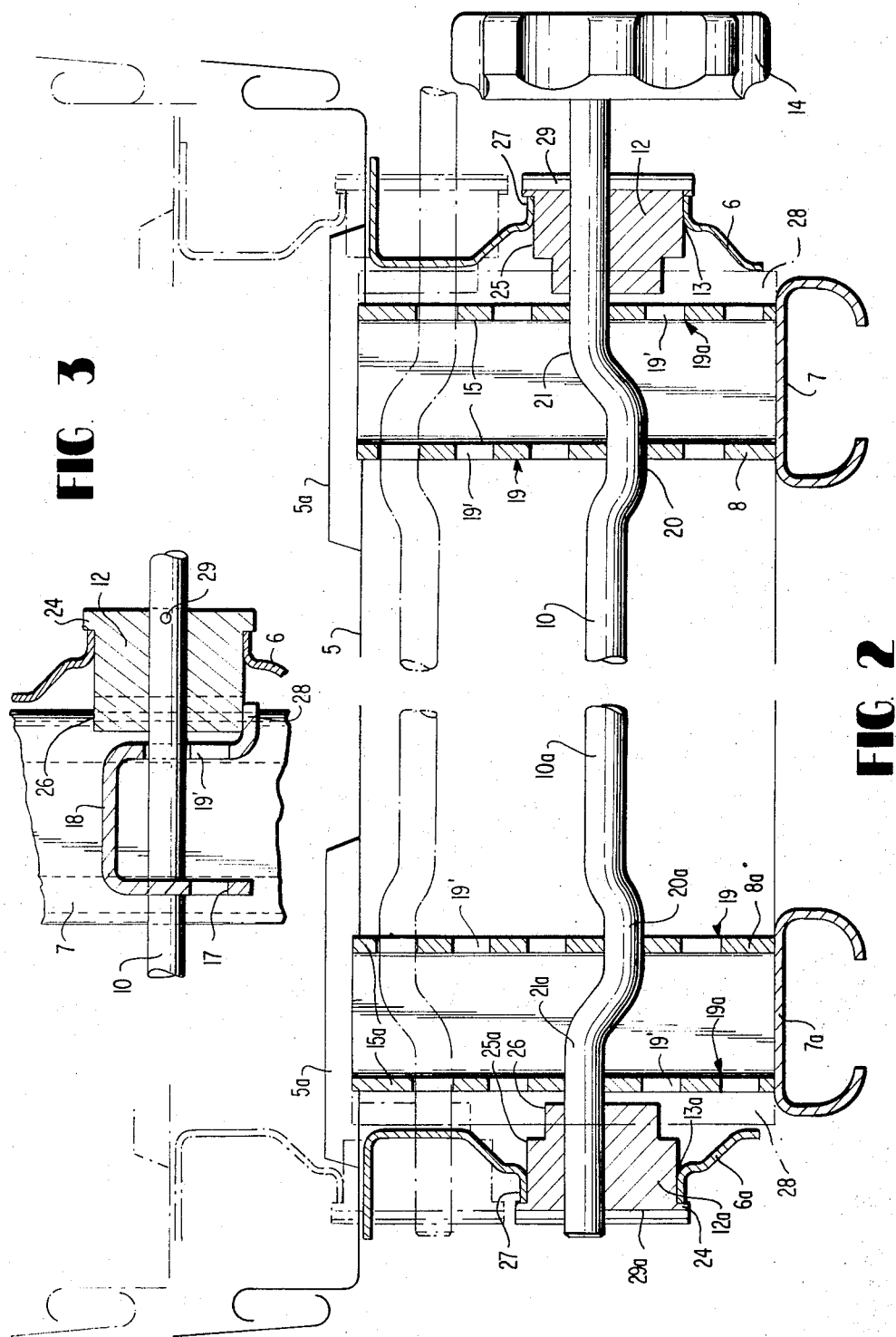

MECHANISM FOR ADJUSTING THE HEIGHT OF SEATS, ESPECIALLY OF MOTOR VEHICLES

The present invention relates to a mechanism for the adjustment of the inclination and height of a seat or the like supported on at least one shaft, especially of a motor vehicle seat, by means of a transmission actuatable by hand.

The installation according to the present invention makes it possible for the vehicle passenger to adjust the seat height and the inclination of the seats, which for the most part are at present adjustable in their longitudinal direction, without great effort and also with a loaded seat in fine steps to the extent desired and required for the comfort of the passenger.

Known in the prior art are seats with a stepless height adjustment consisting of a curved guide means and also such seats with gear transmissions of most varied constructions; with both such adjusting mechanisms a forward and a rear support shaft may be provided. However, these prior art installations are for the most part costly in their manufacture, frequently prone to failures in the operation, and/or not sufficiently finely adjustable. Added thereto is the fact that any damages or breakdowns that may have occurred involve usually high repair costs in these prior art constructions. A further disadvantage of these prior art seats resides in that the known seats for the most part cannot be adjusted by the vehicle passengers while seated thereon, particularly not in the height thereof.

In contradistinction thereto, according to the present invention, the shaft is supported in two side walls or side plates secured at the seats and includes cranked portions preferably adjacent the side walls, which engage in two rows of teeth arranged mutually offset with respect to one another in relation to the height thereof, of which two alternately serve as support bearing means for the associated cranked portions during the rotation of the shaft.

Two shafts preferably provided with a handle or the like may be provided thereby which, as viewed in the driving direction of the motor vehicle, are supported forwardly and rearwardly in a seat side wall and associated columns extending at least approximately vertically, which are provided with toothed rows. By a rotation of one or both shafts, any desired seat height and/or different seat inclinations can be adjusted by hand effortlessly and nearly steplessly also with a loaded seat. This requires a slight crank depth of each shaft and a suitable construction of the rows of teeth. As a result thereof, the rotatable hand wheel at one of the ends of the support shaft projecting on one side beyond the fixed seat part can be easily rotated for purposes of changing the seat height position.

The columns have a U-shaped cross section whose webs face the seat center. Of course, the columns may also consist of individual plates or may have any other suitably constructed cross section, in which appropriate tooth rows are provided.

Longitudinal slots and tooth gaps starting from the longitudinal gaps and also directed toward the seat center are cut into the two legs of the columns. The cranked shaft portions engage into these tooth gaps and roll off at the teeth of the tooth row during the rotation of a shaft. In order to be able to rotate the shafts, the longitudinal slot in the leg portions of the columns is at least as wide as corresponds to the sum of a crank and of the thickness of the support shaft.

The shaft bearings sliding in the seat side walls are advantageously constituted by a bearing body made from service-free, synthetic resinous material of any known suitable type, whose cylindrical bearing portion is rotatably inserted on each longitudinal side of the seat into a round or elongated aperture of the seat side plate.

The elongated aperture may advantageously be arranged in the seat side plates at the front shaft in order to avoid any impairment of the seat adjustment by the additional weight of the backrest.

A spring is stressed between the support shaft supported in the elongated aperture and a fixed seat part or the other shaft, which constantly presses the shafts against the respective tooth rows thereof. To prevent during an impact in the seat longitudinal direction a disengagement of a support shaft out of the tooth rows of the forward seat columns and a subsequently unexpected rapid lowering of the seat which had been raised in front thereof, at least one bearing body of one shaft is advantageously provided with an oval extension cam whose abutment surface abuts at an extension of the column.

Accordingly, it is an object of the present invention to provide a mechanism for adjusting the height of seats, especially of motor vehicle seats, which avoids by simple means the aforementioned shortcomings encountered in the prior art.

Another object of the present invention resides in a mechanism for adjusting the height and/or inclination of motor vehicle seats which is simple in construction yet permits a fine adjustment of the seat into any desired position without great effort.

A further object of the present invention resides in a seat adjustment mechanism of the type described above which permits a manual effortless adjustment of the seat, even with the vehicle passenger seated thereon.

Still a further object of the present invention resides in an installation for adjusting the height of a vehicle seat which minimizes the cost of manufacture, obviates high repair bills in case of failures, and assures reliability in operation free from breakdowns.

Another object of the present invention resides in a seat adjusting mechanism which not only can be easily adjusted by the passenger seated thereon but which also prevents an unexpected sudden drop of the seat from its adjusted height position in case of an accident impact in the longitudinal direction of the vehicle.

These and further objects, features and advantages of the present invention will become more apparent from the following description when taken in connection with the accompanying drawing which shows, for purposes of illustration only, one embodiment in accordance with the present invention, and wherein:

FIG. 1 is a schematic side view of the seat shell of a longitudinally adjustable motor vehicle seat with a height adjusting mechanism in accordance with the present invention and with the shafts thereof shown in cross section, FIG. 2 is a partial cross sectional view taken along line II—II of FIG. 1, and FIG. 3 is a partial cross sectional view taken along line III—III of FIG. 1.

Referring now to the drawing wherein like reference numerals are used throughout the various views to designate like parts, the motor vehicle seat includes a fixed seat shell generally designated by reference numeral 4 (FIG. 1) which is provided with an approximately horizontal seat plate 5 (FIGS. 1 and 2). The cushion parts and the backrest of the seat are not illustrated since they form no part of the present invention. The seat plate 5 is provided on each longitudinal side of the seat with one seat side wall or sideplate 6 and 6a extending down almost to the guide rails 7 and 7a. The seat is constructed so as to be displaceable longitudinally with respect to the vehicle floor by means of the guide rails 7 and 7a in a conventional manner not illustrated herein in detail since it forms no part of the present invention.

In proximity of each end of a seat sideplate one column or upright 8, 8a of U-shaped cross section is rigidly secured on the guide rail 7, 7a (FIG. 2) which projects up into a recess 5a of the seat plate 5. The columns 8 and 8a of U-shaped cross section and of a respective side are symmetrically arranged to one another with respectively mutually facing webs 18.

The seat is adjustably supported in its height with its side plates 6 and 6a on the columns 8 and 8a by means of the shafts 9 and 10 extending over nearly the entire width of the seat shell 5. Each shaft 9, 10 is securely connected at its ends with a respective bearing member 12, 12a of synthetic resinous material, which are each rotatably inserted into apertures 13, 13a (FIG. 2) and 22 (FIG. 1) reinforced by a flange 27 of the seat side plates 6 and 6a. The rear apertures 13 and 13a for the rear shaft 10 are circular while the apertures 22 for the forward shaft 9 are constructed as elongated aperture; the same is true for the corresponding flanges 27 thereof. The ends of the support shafts 9 and 10 project on one side of the seat beyond their bearing members 12 and 12a in the seat side walls 6 and 6a and are connected thereat with a rotatable hand wheel 14.

Each shaft 9 and 10 extends through the pairs of legs 15, 15a and 16 of the columns 8 and 8a disposed on each side between the side plates 6 and 6a of the seat. Each pair of legs 15, 15a (FIG. 2) and 16 (FIG. 1) of the columns 8 and 8a is provided with a slot 17 extending nearly over its entire height. Tooth gaps 19' forming a row of teeth generally designated by reference numeral 19, 19a adjoin the slots 17 on the side thereof near the web 18 (FIG. 3) of each column 8 and 8a. The two rows 19 and 19a of the teeth in the legs 15, 15a and 16 of a column 8 and 8a are constructed similarly but are arranged mutually offset in height. The shafts 9 and 10 engage into the tooth gaps 19' to determine the seat height. The width of a slot 17 corresponds at least to the sum of the cranked portion and of the thickness of a cranked shaft 9 or 10.

Each shaft 9 and 10 is provided with one cranked shaft portion 20 and 20a cranked or offset with respect to its horizontal main portion 10a by about half the shaft thickness, which passes over outwardly thereof into another shaft portion 21 or 21a, once more cranked or offset in the opposite direction, that carries near its outer end a bearing member 12, 12a supported in the seat side walls 6, 6a. The shaft 9, 10 engages with the shaft portions 20, 20a and 21, 21a which are cranked with respect to the main shaft portion 10a, into the tooth rows 19 and 19a of each column 8 and 8a, which are mutually offset by the amount of the respective crank thereof.

During the rotation of one of the two hand wheels 14, the cranked shaft portions 20, 20a and 21, 21a alternately roll off along the teeth of the tooth rows 19, 19a in the columns 8, 8a whereby alternately a respective cranked shaft portion always takes its path by way of the slot 17.

For the compensation of the differing distances of the two shafts 9 and 10 which are engaged differently as regards height, an elongated aperture 22 is cut into the forward end of the seat side plates 6 and 6a as aperture for the bearing support of the shaft 9. In order to compensate for manufacturing inaccuracies and to assure a constant engagement of the support shaft 9 into the tooth rows 19, at least one coil spring 23 for the forward support shaft 9 constantly stressed in the direction toward the tooth row 19 is suspended with one end approximately between the center of the seat plate 5 and with the other end at the forward shaft 9. However, this spring 23 could also be suspended at the other shaft 10.

The bearing members 12, 12a of the shaft 10 is stepped and made from synthetic resinous material which by means of a disk-shaped part 24 covers off against the outside the apertures 13, 13a and 22 reinforced by a flange 27 for the cylindrical bearing part 25, properly speaking. The shaft 9, 10 extends with the shaft portions 21 and 21a through the bearing members 12 and 12a and is secured thereat by means of a pin 29 and 29a (FIGS. 2 and 3). In order to be able to secure the rotatable hand wheels 14 coaxially to the bearing members 12, the hubs of the wheels 14 receiving ends of shafts 21, 21a may be arranged eccentrically by the height of the shaft crank.

In order to prevent an unexpected disengagement of the shafts 9 and 10, engaged in the tooth rows 19 and 19a, during an impact on the vehicle in the seat longitudinal direction that would be followed by a sudden lowering or dropping of the seat occupied by a vehicle passenger and previously adjusted to a suitable height, from which above all bodily injuries may result, the bearing members 12 and 12a for the shaft 10 pass over inwardly in the direction toward the columns 8 and 8a into an oval cam member with an abutment surface 26. The abutment surface 26 abuts at an extension or shoulder 28 (FIG. 3) which is bent off from the outer leg of the pair of legs 15, 15a of the columns 8, 8a in the direction toward the adjacent seat side plate 6, 6a. During each rotary movement of arranged shaft 9, the abutment surface 26 respect the oval cam rolls off constantly at the shoulder 28.

While I have shown and described only one embodiment in accordance with the present invention, it is understood that the same is not limited thereto but is susceptible of numerous changes and modifications as are known to those skilled in the art and I, therefore, do not wish to be limited to the details shown and described herein but intend to cover all such changes and modifications as are encompassed by the scope of the appended claims.

What I claim is:

1. An installation for the adjustment in inclination and height of a seat supported on at least one shaft means by a manually actuatable means, characterized in that the shaft means is supported in two side wall means secured at the seat and is provided with cranked portions which engage in support means forming rows of teeth a-rangee mutually offset to one another with respective to their height, and two tooth rows each serving alternately as bearing support for the associated cranked portions during a rotation of the shaft means.

2. An installation according to claim 1, characterized in that the cranked portions are disposed adjacent the side wall means.

3. An installation according to claim 1, characterized in that the tooth rows are arranged in at least approximately vertically extending column means.

4. An installation according to claim 3, characterized in that two shaft means are provided which are respectively supported forwardly and rearwardly, as viewed in the vehicle driving direction, in a corresponding side wall means and associated column means.

5. An installation according to claim 4, characterized in that each shaft means is provided with a hand wheel.

6. An installation according to claim 5, characterized in that a spring engages, on the one hand, at a shaft means, and, on the other, at one of the two parts consisting of the seat and the other shaft means and thus causes engagement of the cranked shaft portions in tooth gaps of the tooth rows whereby one shaft means is guided in an elongated aperture extending at least approximately horizontally in the side wall means.

7. An installation according to claim 6, characterized in that each column means includes leg portions extending parallel to the side wall means, which are provided with slots and with tooth gaps receiving the cranked shaft portions, the gaps starting from the slots and being directed toward one another, and the slots having a width that just permits the passage of a cranked shaft portion during the rotation of the shaft which at the same time is supported with the other cranked portion in the adjacent tooth gap.

8. An installation according to claim 7, characterized in that the shaft section, with which the shaft is supported in the side wall means, is non-rotatably connected with a bearing means of synthetic material.

9. An installation according to claim 8, characterized in that the bearing means is so constructed that it abuts with an abutment surface thereof at an extension of a leg portion of the column means.

10. An installation according to claim 9, characterized in that the extension is formed by a bent portion of a leg of the column means which is substantially U-shaped in cross-section.

11. An installation according to claim 10, characterized in that the cranked portions are disposed adjacent the side wall means.

12. An installation according to claim 1, characterized in that a spring engages, on the one hand, at a shaft means and, on the other, at one of the two parts consisting of the seat and the other shaft means and thus causes engagement of the cranked shaft portions in tooth gaps of the tooth rows whereby one shaft means is guided in an elongated aperture extending at least approximately horizontally in the side wall means.

13. An installation according to claim 3, characterized in that each column means includes leg portions extending parallel to the side wall means, which are provided with slots and with tooth gaps receiving the cranked shaft portions, the gaps starting from the slots and being directed toward one another, and the slots having a width that just permits the passage of a cranked shaft portion during the rotation of the shaft which at the same time is supported with the other cranked portion in the adjacent tooth gap.

14. An installation according to claim 1, characterized in that the shaft section, with which the shaft is supported in the side wall means, is non-rotatably connected with a bearing means of synthetic material.

15. An installation according to claim 14, characterized in that the bearing means is so constructed that it abuts with an abutment surface thereof at an extension of a leg portion of a column means.

16. An installation according to claim 15, characterized in that the extension is formed by a bent portion of a leg of the column means which is substantially U-shaped in cross section.

* * * * *